United States Patent [19]

Daude et al.

[11] Patent Number: 5,279,882
[45] Date of Patent: Jan. 18, 1994

[54] ENCAPSULATED WINDOW READY FOR MOUNTING AND FABRICATION METHOD THEREFOR

[75] Inventors: Gérard Daude, Villenave D'Ornon; Jean-Louis Bravet, Thourotte; Gerard Dimier, Talence, all of France

[73] Assignee: Saint-Gobain Vitrage International, Aubervilliers Cedex, France

[21] Appl. No.: 792,594

[22] Filed: Nov. 15, 1991

[30] Foreign Application Priority Data

Nov. 16, 1990 [FR] France ................... 90 14259

[51] Int. Cl.⁵ .............................. B32B 23/02
[52] U.S. Cl. .................... 428/192; 428/194; 428/343; 428/355; 428/420; 428/423.1; 428/424.2; 428/424.6; 528/905
[58] Field of Search ........... 428/192, 194, 420, 423.1, 428/424.2, 424.6, 343, 355; 528/905

[56] References Cited

U.S. PATENT DOCUMENTS

| | | | |
|---|---|---|---|
| 4,525,511 | 6/1985 | Kirby et al. | 524/158 |
| 5,082,736 | 1/1992 | Bravet et al. | 428/425.6 |
| 5,157,100 | 10/1992 | Babjak et al. | 528/73 |

Primary Examiner—Patrick J. Ryan
Assistant Examiner—Marie R. Macholl
Attorney, Agent, or Firm—Oblon, Spivak, McClelland, Maier & Neustadt

[57] ABSTRACT

One-piece or laminated window fitted with a peripheral duplicate-molded profile ready for mounting by adhesive bonding in a bay, wherein the surface of the peripheral profile intended to be bonded is coated with a polymerized layer obtained from a composition, which contains an isocyanate constituent and a polyalcohol constituent present in excess in relation to the isocyanate constituent in order to form, after polymerization, a polyurethane layer having free hydroxyl groups capable of reacting subsequently with the adhesive strip used to mount the window, wherein the polyalcohol constituent contains at least one polyvinyl chloride copolymer containing free hydroxyl groups.

11 Claims, No Drawings

ENCAPSULATED WINDOW READY FOR MOUNTING AND FABRICATION METHOD THEREFOR

BACKGROUND OF THE INVENTION

1. Field of the Invention

The present invention relates to an encapsulated window ready for mounting by adhesive bonding in the bay of a body.

2. Description of the Background

Mounting windows for motorized vehicles by adhesive bonding in the bay of a vehicle body has several advantages, namely; it ensures the position maintenance of the window in the bay of the body in the event of violent shock; it can be automated; and it permits the window to be fitted flush in the body, thereby reducing the penetration coefficient of the vehicle in the air.

When mounting a one-piece or laminated window not incorporating a duplicate-molded profile, adhesive bonding of the window in the body bay is achieved by depositing a suitable adhesive strip on an enameled edge provided on the periphery of the surface of the window turned toward the passenger compartment. This enameled edge is designed, in particular, to protect the adhesive from UV radiation, which might damage its properties. It also serves an aesthetic function by hiding an unsightly glue joint.

When the window is encapsulated, i.e., when it is provided with a duplicate-molded peripheral profile (or encapsulation joint) designed, in particular, to replace the finishing joint, mounting of the window by adhesive bonding may be achieved as in the mounting of previous windows, i.e., by bonding on the glass or an enameled edge at the boundary of the duplicate-molded profile. In one variant, bonding may take place directly on the duplicate-molded profile. However, in this variant the bond obtained using conventional glue joints is not satisfactory, since the adhesive forces are generally insufficient or are not preserved over time.

This poor adhesion may result from the presence on the duplicate-molded profile of a residue of the unmolding product, which may be used during the manufacture of an encapsulation joint, especially one made of polyurethane, for the purpose of preventing the duplicate-molded profile from being glued to the mold during its fabrication. When the encapsulated window is removed from the mold, some of the unmolding product is left on the profile, and even cleaning with various types of solvents does not make it possible to obtain satisfactory bonding properties. Poor adhesion may also result, in particular when a profile is duplicate molded using polyvinyl chloride (PVC), from stabilization agents used to combat the effects of light, or from plasticizers which may be incorporated, as needed, into the material used to form the profile.

European Patent Publication EP 0 378 462 describes an encapsulated window ready for installation and which possesses a bonding capacity meeting the safety standards for windows.

The encapsulated window described EP 0 378 462 is a one-piece or laminated window containing, on its periphery, a duplicate-molded profile (or encapsulation joint), one surface of which is designed to be glued in a bay of a body, such as the bay of the body of a motorized vehicle, e.g. by means of an adhesive strip, said surface being reactive since it contains free OH groups capable of reacting subsequently with the adhesive strip used for mounting the window in the bay.

The solution proposed in EP 0 378 462 is entirely satisfactory, for a window fitted with a polyurethane-based duplicate-molded profile. This profile can be produced by RIM (reaction injection molding) or by thermoplastic injection.

However, in the case of a duplicate-molded profile made of polyvinyl chloride (PVC), the recommended solution does not afford satisfactory results. In particular, adhesive bonding of this duplicate-molded profile with polyurethane mastics currently used for gluing windows in body bays may prove insufficient from the beginning, or this bond may not be sufficiently preserved over time.

Thus, a need exists for a window which is ready for mounting and having adhesive bonding in a body bay which is strong at the outset and which is also preserved over time.

SUMMARY OF THE INVENTION

Accordingly, it is an object of the present invention to provide a one-piece or lamination window ready for mounting by adhesive bonding in a bay.

It is also an object of this invention to provide such a window having improved bonding capability and which is preserved over time.

It is also an object of the present invention to provide a method for manufacturing a duplicate-molded window having such properties.

The above objects and others which will become more apparent in view of the following disclosure are provided by a one-piece or laminated window fitted with a peripheral duplicate molded profile ready for mounting by adhesive bonding in a bay, the surface of the peripheral profile ready for mounting by adhesive bonding in a bay, the surface of the peripheral profile intended to be bonded being coated with a polymerized layer obtained from a composition, which contains an isocyanate constituent and a polyalcohol constituent present in excess in relation to the isocyanate constituent in order to form, after polymerization, a polyurethane layer having free hydroxyl groups capable of reacting subsequently with the adhesive strip used to mount the window, wherein the polyalcohol constituent contains at least one polyvinyl chloride (PVC) copolymer containing free hydroxyl groups.

DETAILED DESCRIPTION OF THE PREFERRED EMBODIMENTS

In accordance with the present invention, a new one-piece or laminated window is provided having, on its periphery, a duplicate molded profile whose surface designed for adhesive bonding in a body bay is coated with a polymerized layer obtained from a compound containing basic constituents, so as to form, after polymerization, a polyurethane containing free OH groups, the polyalcohol constituent being present in excess in terms of equivalents in relation to the isocyanate constituent, the ratio of the NCO groups to the OH groups ranging between 0.30 and 0.99 and the polyalcohol constituent containing at least one polyvinyl chloride (PVC) copolymer containing free hydroxyl groups.

As the PVC copolymer containing hydroxyl groups, use may be made of vinyl resins having the following general structure:

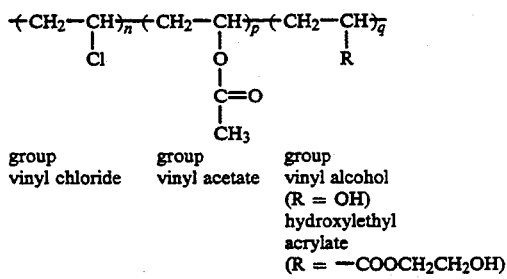

group vinyl chloride | group vinyl acetate | group vinyl alcohol (R = OH) hydroxylethyl acrylate (R = —COOCH₂CH₂OH)

and molar masses ranging between approximately 1,000 and 100,000, and preferably between approximately 5,000 and 50,000, the vinyl chloride group corresponding to approximately 50 to 95% by weight, the vinyl acetate group corresponding to approximately 2 to 40% by weight, and the vinyl alcohol or hydroxyethyl acrylate group corresponding to approximately 2 to 40% by weight.

According to one aspect of the present invention, the reactive compound used may contain, as the polyalcohol constituent and in addition to the PVC-type copolymer containing hydroxyl groups, at least one other polyalcohol, preferably a diol having a mold mass of less than 400 and chosen from among those generally used as chain extenders in the preparation of polyurethanes. Mention may be made, for example, of ethyleneglycol, 1,2-propanediol, 1,3-propanediol, 1,2-, 1,3-, 1,4-butanediol, 2,2-dimethyl, 1,3-propanediol (neopentylglycol), 1,5-pentanediol, 1,6-hexanediol, 1,8-octanediol, 1,10-decanediol, 1,12-dodecanediol, cyclohexanedimethanol, bisphenol A, 2-methyl-2,4-pentanediol, 3-methyl-2,4-pentanediol, 2-ethyl-1,3-hexanediol, 2,2,4-trimethyl-1,3-pentanediol, diethyleneglycol, triethyleneglycol, tetraethyleneglycol, 2-butyne-1,4-diol, substituted and/or etherified 1,4-butenediol and decynediol, hydroquinone-bis-hydroxyethylether, bisphenol A etherified using two or four groups of propylene oxide, and dimethylolpropionic acid.

The polyalcohol constituent of the compound used may also contain a polyalcohol having a functionality greater than two, such as aliphatic monomer triols such as glycerol, trimethylylolpropane, triols having polyether chains, and polycaprolactone triols, the molar mass of these triols generally ranging between 90 and 1,000, mixed polyether/polyester polyalcohols whose functionality is greater than 2, e.g., a functionality of between 2 and 3.

The polyalcohol constituent may also contain at least one long polyalcohol whose molar mass is between 400 and 4,000 and which is chosen from the polyetherdiols, polyesterdiols, and polycaprolactonediols.

The PVC containing hydroxyl groups represents from 0.1 to 1 OH equivalent for 1 total equivalent of the polyalcohol constituent.

The proportion between the number of OH equivalents added by the PVC containing OH groups (PVC-OH) and the number of OH equivalents added by the other polyalcohol(s) generally depends upon the molar mass of the PVC-OH used.

Thus, the number of OH equivalents added by the PVC-OH will generally be low in proportion as its molar mass is high, for a given percentage by weight of vinyl alcohol or hydroxyethyl acrylate groups. It will be understood that the higher the number of free OH groups in a given PVC-OH, the more reactive will be the product.

Another important aspect of the present invention is the presence of OH groups at the surface of the treated duplicate-molded profile. These excess OH groups must be stable, i.e., they must remain reactive during storage, even for a protracted period, so as to be able to react at a later date with the free NCO groups of the adhesive joint, normally a polyurethane joint, which is not completely polymerized at the time of installation.

The isocyanate constituent may be chosen from among the aliphatic or aromatic difunctional isocyanates, such as hexamethylenediisocyanate, 2,2,4-trimethyl-1,6-hexamethylenediisocyanate, bis (4-isocyantocyclohexyl) methane, 1,3-isocyanato-3,5,5-isocyanatomethyltrimethylcyclohexane (IPDI), tolylene diisocyanate (TDI), isocyanates whose functionality is greater than 2, such as isocyanate biurets, isocyanurates, diisocyanatodiphenylmethane which is partially polymerized and whose functionality is between 2 and 3, etc.

The invention also provides a method for manufacturing a duplicate-molded window having improved bonding capability and which is preserved over time, for mounting of the duplicate-molded window in the bay of a body.

The method according to the present invention entails forming a superficial layer on at least the surface of the duplicate-molded joint on which the bonding strip is placed, and using a composition of a reactive mixture suitable for forming a layer of polyurethane with free OH groups, the polyalcohol constituent containing at least one PVC containing OH groups; it further consists in polymerizing, at least partially, the layer deposited.

The composition can be applied as a solution in a solvent, in particular so as to facilitate its application on the profile to be treated.

The polymerization of the coating layer obtained using the treatment composition can be carried out thermally at high temperature for a short period, e.g., at a temperature of approximately 80° to 120° C. for from one to several minutes. It can also be performed at ambient temperature, i.e., approximately 20° to 25° C. for a much longer period, e.g., 24 hours. Between these two types of polymerizations, any other thermal polymerization cycle can be considered. The advantage of rapid polymerization lies mainly in much greater ease of handling of the treated window. Use may also be made, as required, of other types of polymerization, e.g., using microwaves, catalysis in the vapor phase, radiation, etc.

In a preferred embodiment of the invention, before coating the surface of the duplicate-molded profile to be treated, this latter is pretreated.

This pretreatment may consist in cleaning using a solvent, and it may be performed one or several times. The purpose is, in particular, to remove from said surface, at least partially, the unmolding substance (when this product is used during the joint-molding procedure), and/or, as needed, the stabilizing agent or the other agents adversely affecting adhesion. The solvent used for pretreatment may be chosen, in particular, from among the chlorinated solvents, turpentine, white spirit, pentane, tetrahydrofuran (THF), etc., either alone or in mixtures. Acetone, heptane, or isododecane are preferably used.

As previously indicated, the invention is advantageously applied to a window fitted with an encapsulation profile made of PVC. It may thus also apply to a profile made of PVC obtained by thermoplastic injection or by reduced-pressure injection of a mixture possessing the adequate viscosity of a PVC with a catalyst, e.g., widely-used products known under the name plastisol. It also applied to a profile made of polyurethane obtained by thermoplastic injection or reaction injection (RIM), or, yet again, to a profile obtained by thermoplastic injection of other thermoplastic substances, such as thermoplastic elastomers, in particular olefinic or styrene elastomers.

To facilitate the deposit and the formation of the coating layer according to the invention, a solution of the reactive composition intended to form a polyurethane containing free OH groups is prepared. To this end, a solvent is added, such as methylethylketone or methylisobutylketone. The concentration of the solution of the reactive mixture depends on the desired thickness of the coating layer. This concentration generally ranges between 10 and 50% by weight.

The solution on the duplicate-molded profile may be deposited, for example, using a felt.

Other features and advantages of the invention will emerge in the following description of examples of window and treatments in accordance with the invention.

EXAMPLE 1

An encapsulated window for automobiles, e.g., a window for the rear lateral panel of the body, is manufactured using the thermoplastic injection molding procedure.

The injected product used is polyvinyl chloride with no nitrile groups, chosen from among those conventionally used for this application. For this purpose, the glass window is placed in a mold. Following fabrication of the duplicate-molded profile on the window, the encapsulated window is unmolded and the surface of the duplicate-molded joint, or at least the surface intended to be bonded subsequently in the bay of the body by means of a glue strip, is treated with acetone.

After drying for several minutes at ambient temperature, a felt is used to apply, on the cleaned and dried surface, a compound formed from a mixture of an isocyanate constituent, i.e., methylene diphenyidiisocyanate that has been partially polymerized and has a functionality of between 2 and 3 and a polyalcohol constituent formed basically from a PVC having hydroxyl ends and a molar mass of approximately 5,500 and corresponding to the general formula:

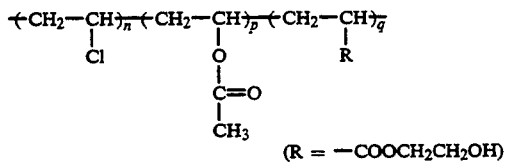

(R = —COOCH$_2$CH$_2$OH)

in which the vinyl chloride group accounts for approximately 67% by weight, the vinyl acetate group, approximately 11% by weight, and the acrylate group, approximately 22% by weight.

The constituents are apportioned in quantities such that 0.8 isocyanate equivalent corresponds to 1 OH equivalent.

The composition also contains dibutyltin dilaurate as the polyurethane catalyst in the proportion of 0.3% of the weight of the polyurethane constituents.

The composition is preferably applied as a solution of the mixture described above in methylethylketone, the concentration of the reactive mixture being approximately 25% by weight.

The reactive compound is spread on the duplicate-molded joint using a felt. After spreading, polymerization in carried out by heating in a chamber at 1200° C., which gives a skin temperature of approximately 850° C. for about five minutes. After drying, the thickness of the layer deposited is approximately 15 to 25 μm.

The encapsulated window ultimately obtained can be installed by adhesive bonding in the bay of a body. This bonding capability is preserved even after lengthy storage of the window. The adhesive strip used for gluing can be any adhesive strip used for direct gluing of the glass or of an enameled edge to the bay of the body. Mention may be made, for example, of a polyurethane strip or mastic incorporating two components or a polyurethane strip or mastic having one moisture-hardenable component.

Adhesion obtained between the duplicate-molded profile of the window and the adhesive strip is solid and durable.

This adhesion can be assessed using a stripping test on a test specimen formed by a tongue-shaped piece of the material used to make the encapsulation profile, 2 cm wide, on which adhesive stripping of the same width used for mounting by gluing of the window in the bay of the body has been laid down and hardened by polymerization. The adhesive strip is a joint marketed under the name BETASEAL HV3. The adhesive strip is placed on the treated duplicate-molded profile of the invention according to two procedures: in one, the strip is laid down just after treatment, and, in the other, the strip is positioned on the profile seven days after treatment.

Measurements of adhesion by stripping the specimens at 180° C. are made immediately after hardening of the adhesive mastic under normal conditions; here, the hardening period takes 12 days. The adhesion measured is $H_0$. In addition, the adhesion $H_7$ is measured after seven additional days under conditions of moist wrapping, conditions known according to the RENAULT 1165 $H_7$ test method.

Generally, a cohesive rupture of the adhesive strip is sought, with values at least equal to 60 N/cm for $H_0$ and to 40 N/cm for $H_7$.

The values thus measured for Example 1 are:
$H_0$ = average of 70 N/cm
$H_7$ = average of 50 N/cm with cohesive rupture of the bonding strip.

COMPARATIVE EXAMPLES

A duplicate-molded window is manufactured as in Example 1. However, after unmolding of the encapsulated window, the surface of the profile to be glued is pretreated with only one or several solvents,, such as those previously described; i.e., without treating this surface using a reactive compound.

COMPARATIVE EXAMPLE 1

The surface is cleaned several times with acetone. The values obtained, as measured under the conditions previously described, are $H_0$=20 N/cm with an adhesive rupture. Measurement of $H_7$ is superfluous.

COMPARATIVE EXAMPLE 2

The surface is cleaned using heptane. The $H_0$ value obtained is 20 N/cm with adhesive rupture.

COMPARATIVE EXAMPLE 3

The procedure followed is that of Example 1, except that, after drying, application is made of a reactive compound which is different by virtue of the fact that it contains no PVC containing OH groups as the polyalcohol constituent, but rather a mixture of a polypropyleneglycol in the proportion of a 0.3 equivalent and of 1,4-butanediol in the proportion of a 0.7 OH equivalent for a 0.8 NCO equivalent. The adhesive compound is a 20% solution in methylethylketone.

The values measured for this comparative example are:

$H_0$ = average of 30 N/cm
$H_7$ = average of 15 N/cm;
this is not a satisfactory result, since the rupture is cohesive or adhesive, depending on the samples.

EXAMPLE 2

The procedure used in Example 1 is repeated, except that the PVC containing hydroxyl groups used in that example is replaced by another PVC containing hydroxyl groups and having a molar mass of approximately 27,000, and in which the vinyl chloride group accounts for approximately 90% by weight, the vinyl acetate group, approximately 4% by weight, and the vinyl alcohol group, approximately 6% by weight.

The reactive compound is placed in a 13% solution in methylethylketone.

The other conditions are identical to those in Example 1. The following stripping values are ultimately obtained:

$H_0$ = 6 5 N/cm
$H_7$ = 45 N/cm.
The rupture is cohesive.

EXAMPLE 3

The procedure used is the same as in Example 1, but this time using a PVC containing hydroxyl groups having a molar mass of approximately 15,000 and in which the vinyl chloride group accounts for 81% by weight, the vinyl acetate group, 4% by weight, and the hydroxymethyl acrylate group, 15% by weight. The reactive compound is placed in a 15% solution in methylethylketone.

The following stripping values are ultimately obtained:

$H_0$ = 70 N/cm
$H_7$ = 65 N/cm.
The rupture is cohesive.

EXAMPLE 4

The procedure used in Example 1 is followed, except that the ratio of the constituents is modified by adding an 0.6 NCO equivalent for 1 OH equivalent.

The other conditions remain unchanged.
The following stripping values are obtained:
$H_0$ = 68 N/cm
$H_7$ = 52 N/cm.
The rupture is cohesive.

Comparative Example 4

The procedure used in Example 1 is followed, except that the ratio of the constituents is modified by adding 1 NCO equivalent for 1 OH equivalent.

The following stripping values are obtained:
$H_0$ = 70 N/cm
$H_7$ = 15 N/cm, which is insufficient.

The rupture is cohesive or adhesive, depending on the samples. The use of a reactive compound not containing an excess of OH groups provides adhesion which is not sufficiently preserved over time.

EXAMPLE 5

The procedure followed is that of Example 1, except that, as the polyalcohol constituent, use is made of a mixture of the PVC containing OH groups described in that example with 1,4-butanediol in the proportion of 0.1 OH equivalent for the PVC containing OH groups and of 0.9 OH equivalent for the 1.4-butanediol.

Polymerization is preferably performed without catalyst, in order to increase the period of preservation of the preparation prior to use for treatment of the duplicate-molded profile.

The reactive composition is placed in a 15% solution in methylethylketone.

The other conditions are those specified in Example 1. The stripping values are:
$H_0$ = 65 N/cm
$H_7$ = 45 N/cm.
The rupture is cohesive.

COMPARATIVE EXAMPLE 5

The procedure in Example 1 is followed, except that, as the polyalcohol constituent, use is made of a copolymer having a formal group in place of the vinyl chloride group.

The molar mass of this terpolymer ranges between 25,000 and 150,000.

The results of the stripping test are as follows:
$H_0$ = 20 to 45 N/cm with adhesive rupture
$H_7$ = not measured.
The terpolymer tested is thus not satisfactory.

COMPARATIVE EXAMPLE 6

The procedure in Example 5 is repeated, except that, as the polyalcohol constituent, a mixture of a terpolymer having a formal group is used in place of the vinyl chloride group and of 1,4-butanediol, by adding a 0.25 OH terpolymer equivalent and a 0.75 OH equivalent of 1,4-butanediol.

Caking of the reactive compound is observed, thus making it unusable for the application sought.

EXAMPLE 6

The reactive compound in Example 5 is used to treat an encapsulated window in which the duplicate-molded profile has as its base a PVC having nitrile groups chosen from among those conventionally used for this type of application.

The other conditions are those specified in Example 1.

The stripping values are as follows:
$H_0$ = 100 N/cm
$H_7$ = 60 N/cm.
The rupture is cohesive.

EXAMPLE 7

The procedure used in Example 6 is repeated, except that the proportions between the two polyalcohols forming the polyalcohol constituent of the reactive compound are modified; i.e., use is made of a 0.3 OH equivalent of PVC having OH groups and a 0.7 OH equivalent of 1,4-butanediol.

The stripping values are as follows:
$H_0$ = 90 N/cm $H_7 = 60$ N/cm.

The rupture is cohesive.

EXAMPLE 8

The procedure used in Example 6 is followed, except that the proportions between the two polyalcohols forming the polyalcohol constituent of the reactive compound are modified; i.e., use is made of a 0.9 OH equivalent of PVC having OH groups and a 0.1 OH equivalent of 1,4-butanediol.

The stripping values are as follows:

$H_0 = 85$ N/cm $H_7 = 55$ N/cm.

The rupture is cohesive.

EXAMPLE 9

An encapsulated window is manufactured using the molding procedure involving thermoplastic injection of a polyurethane (TPU) widely known for this type of application.

Using the compound in Example 6, the procedure used in Example 1 is carried out.

The stripping values are as follows:

$H_0 = 70$ N/cm $H_7 = 58$ N/cm.

The rupture is cohesive.

EXAMPLE 10

An encapsulated window for automobiles is manufactured using the reaction injection molding procedure (procedure known as RIM), i.e., a procedure in which the injected duplicate-molding substance is a reactive mixture which reacts and hardens in the mold.

The product used is here a mixture of constituents capable of forming a polyurethane profile. To this end, the window is placed in a mold in which the part corresponding to the profile to be formed has been preliminarily coated with an unmolding agent, i.e., a polyethylene wax. After the encapsulation operation, the encapsulated window is unmolded and the surface of the duplicate-molded profile intended to be glued in the bay of the body using the glue strip is treated, i.e., cleaned using acetone.

After drying for several minutes at ambient temperature, a felt is used to apply the reactive compound already used in Example 5 to the cleaned and dried surface. A superficial layer approximately 20 μm thick is formed, which is heat-polymerized in a chamber at 120° C. for approximately 5 minutes.

The procedure used in Example 1 is then repeated.

The measurements of adhesion by stripping are as follows:

$H_0 = 75$ N/cm $H_7 = 60$ N/cm.

The reactive compound according to the invention can thus be advantageously used to manufacture windows fitted with an encapsulation profile and ready for installation, both when the encapsulation profile is nitrile PVC-based or not and when it has as its base other conventional encapsulation materials, such as thermoplastic polyurethanes or those obtained by reaction injection (RIM).

Having described the present invention, it will be apparent to one of ordinary skill in the art that many changes and modifications may be made to the above-described embodiments without departing from the spirit and the scope of the present invention.

What is claimed as new and desired to be secured by Letters Patent of the United States is:

1. A one-piece or laminated window fitted with a peripheral duplicate molded profile ready for mounting by adhesive bonding in a bay, wherein the surface of the peripheral profile intended to be bonded is coated with a polymerized layer obtained from a composition which comprises an isocyanate constituent and a polyalcohol constituent present in excess in relation to the isocyanate constituent in order to form, after polymerization, a polyurethane layer having free hydroxyl groups capable of reacting subsequently with the adhesive strip used to mount the window, wherein the polyalcohol constituent contains at least one polyvinylchloride copolymer containing free hydroxyl groups, wherein the ratio of NCO groups to OH groups of the composition ranges between about 0.30 and 0.99.

2. The window of claim 1, wherein said at least one polyvinylchloride copolymer containing free hydroxyl groups is made of vinyl resins having the following structure:

$$\mathrm{-(CH_2-CH)_n-(CH_2-CH)_p-(CH_2-CH)_q-}$$
$$\begin{array}{ccc} | & | & | \\ Cl & O & R \\ & | & \\ & C=O & \\ & | & \\ & CH_3 & \end{array}$$

group vinyl chloride; group vinyl acetate; group vinyl alcohol (R = OH) hydroxylethyl acrylate (R = —COOCH$_2$CH$_2$OH)

and a molar mass ranging between approximately 1,000 and 100,000 wherein n is chosen so that the vinyl chloride group corresponds to approximately 50–95% by weight, p is chosen so that the vinyl acetate group corresponds to approximately 2–40% by weight, and q is chosen so that the vinyl alcohol or hydroxyethyl acrylate group corresponds to approximately 2–40% by weight.

3. The window of claim 1, wherein the polyalcohol constituent additionally contains at least a diol whose molar mass is less than 400.

4. The window of claim 3, wherein the diol is selected from the group consisting of 1,4-butanediol and ethylene glycol.

5. The window of claim 1, wherein the isocyanate constituent has as its base methylenediphenyl-diisocyanate having a functionality of between 2 and 3.

6. The window of claim 2, wherein the polyvinylchloride copolymer containing hydroxyl groups has a molar mass ranging between approximately 2,000 and 50,000.

7. The window of claim 1, wherein the duplicate-molded profile is made of polyvinylchloride.

8. The window of claim 1, wherein said adhesive strip comprises a polyurethane strip or mastic incorporating two components or a polyurethane strip or mastic having a moisture-hardenable component.

9. The window of claim 1, wherein the polyalcohol constituent further contains an aliphatic monomer triol having a molar mass of between 90 and 1000.

10. The window of claim 1, wherein the polyalcohol constituent further contains polyetherdiols, polyesterdiols or polycaprolactonediols having a molar mass of between 400 and 4,000.

11. The window of claim 1, wherein the polyvinylchloride copolymer represents from 0.1 to 1 OH equivalent for 1 total equivalent of the polyol constituent.

* * * * *